United States Patent [19]

Tamburrino et al.

[11] Patent Number: 5,467,124
[45] Date of Patent: Nov. 14, 1995

[54] FILM HOLDER FOR VIDEO PROBE

[75] Inventors: Richard A. Tamburrino, Auburn; Jack L. Connelly, Jr., Camillus, both of N.Y.

[73] Assignee: Welch Allyn, Inc., Skaneateles Falls, N.Y.

[21] Appl. No.: 190,317

[22] Filed: Feb. 2, 1994

[51] Int. Cl.$^6$ .................................................... H04N 7/18
[52] U.S. Cl. .................................................... 348/66; 348/68
[58] Field of Search ............................ 348/96, 110, 112, 348/64, 65, 66, 68, 839; 378/165, 168–170, 185, 187; 355/38; 128/4–8; H04N 7/18, 7/22

[56] References Cited

U.S. PATENT DOCUMENTS

| | | | |
|---|---|---|---|
| 4,908,876 | 3/1990 | DeForest et al. | 382/54 |
| 5,022,065 | 6/1991 | Wijkström | 378/169 |
| 5,134,469 | 7/1992 | Uchimura | 348/64 |
| 5,218,978 | 7/1992 | Roth et al. | 378/185 |
| 5,365,267 | 11/1994 | Edwards | 348/68 |

*Primary Examiner*—Scott A. Rogers
*Assistant Examiner*—Kim Yen Vu
*Attorney, Agent, or Firm*—Harris Beach & Wilcox

[57] ABSTRACT

A film holder for a video display system, having a probe with a head portion, a processor, a monitor, and a printer for producing a permanent hard copy of the image received by the probe, includes a housing for positioning the film relative to the head of the video probe. The housing is provided with an aperture for receiving, positioning, and securing the head of the video probe within the housing. The housing also includes a diffuser for diffusing light entering the housing, and a slidable frame positioned between the diffuser and the housing aperture. The sliding frame is employed to secure the film at a predetermined distance from the head of the video probe. The sliding frame is provided with quick release fasteners so that individual pieces of x-ray film are easily interchanged within the frame.

6 Claims, 1 Drawing Sheet

FILM HOLDER FOR VIDEO PROBE

BACKGROUND OF THE INVENTION

1. Field of the Invention

This invention relates in general to video display systems and, in particular, to such systems used in the field of dentistry. More specifically, but without restriction to the particular embodiment hereinafter described in accordance with the best mode of practice, this invention relates to a holder mountable over the head of a video probe to position film a predetermined distance from the head.

2. Discussion of the Related Art

Numerous fields of art have benefitted with the advent of CCD video technology. One such field is dentistry. Dentists are currently able to employ video display systems to view real time images of a patient's dental anatomy. These systems typically include a video probe with a head portion, a video processor, and a monitor for viewing an image received by the probe. The probe commonly has a remote source of illumination whose light is transferred to the head of the probe by a bundle of fiber optic cables. These dental video display systems can include a printer so that any selected image on the monitor may be permanently recorded in hard copy.

Dentists equipped with this type video display system have employed the printer to produce a permanent picture or copy of the image of a dental x-ray previously taken while the patient was in the dentist's office. Such hard copy pictures are needed for any one of a number of reasons including satisfying insurance requirements or conveniently transferring dental records from one dentist to another. One difficulty encountered by dentists utilizing a dental video display system for producing hard copy pictures of dental x-rays, is proper and steady positioning of the film within the field of view of the probe head. Despite this known difficulty, there has not been proposed prior hereto any device for accurately positioning x-ray film relative to the head of a dental video probe so that a clearly focused permanent image of the film may be produced.

OBJECTS AND SUMMARY OF THE INVENTION

It is, therefore, an object of the present invention to improve video display systems.

It is a further object of the present invention to securely position an exposed film relative to the head of a video probe so that the image of the film is clearly focused.

Still another object of the present invention is to diffuse ambient light to evenly illuminate the reverse side of an exposed film securely positioned relative to the head of a video probe.

It is still a further object of the present invention to quickly and easily change one piece of exposed film for another in a housing adapted to be removably mountable on the head of a video probe.

Yet another object of the present invention is to enable a video display system, having a video probe, a video processor, a monitor for viewing an image received by the probe, and a printer, to easily take clearly focused hard copy pictures of the image on an exposed film.

An additional object of the present invention is to accommodate the need of dentists equipped with a video display system for producing clearly focused hard copy pictures of dental x-rays while the patient is absent from the dentist's office.

It is yet a further object of the present invention to utilize the fiber optic light source of a video probe to illuminate an exposed film securely positioned relative to the head of the probe.

Yet a further object of the present invention is to accurately position x-ray film relative to the head of a dental video probe so that a clearly focused permanent image of the film may be produced.

These and other objects are attained in accordance with the present invention wherein there is provided a film holder for a video display system having a probe with a head portion, a processor, a monitor, and a printer for producing a permanent hard copy picture of the image received by the probe. In accordance with one aspect of the present invention, the film holder includes a housing for positioning the film relative to the head of the video probe. The housing, according to other aspects of this invention, is in turn provided with an aperture for receiving, positioning, and securing the head of the video probe within the housing, a diffuser for diffusing light entering the housing, and a slidable frame positioned between the diffuser and the housing aperture. The sliding frame is employed to secure the film at a predetermined distance from the head of the video probe. In accordance with yet another aspect of the present invention, the sliding frame is provided with quick release fasteners so that individual pieces of x-ray film are easily interchanged within the frame.

BRIEF DESCRIPTION OF THE DRAWING

Further objects of the present invention together with additional features contributing thereto and advantages accruing therefrom will be apparent from the following description of a preferred embodiment of the invention which is shown in the accompanying drawing, wherein.

DETAILED DESCRIPTION OF A PREFERRED EMBODIMENT

Figure 1:
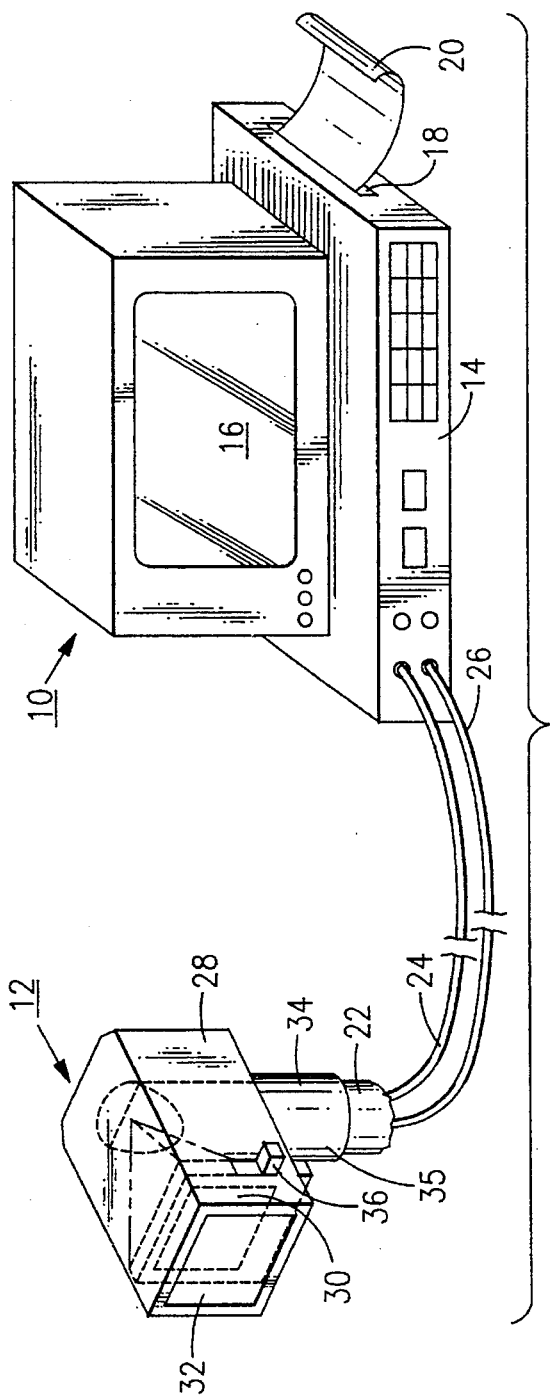
FIG. 1 is a partially broken away perspective view of a dental video display system equipped with the film holder of the present invention.

Referring now to the drawing and initially to FIG. 1, there is shown a dental video display system generally referenced 10 equipped with an x-ray film holder 12 in accordance with the present invention. The film holder 12 is herein described in conjunction with a dental video probe and display system only by way of illustration rather than limitation, it being understood that the film holder 12 is readily adaptable to any type of video probe or film.

The dental video display system 10 includes a video processor 14 which is connected to a video monitor 16. The video processor 14 of the system 10 is equipped with a system printer 18 shown issuing a permanent hard copy picture 20. The video display system 10 further includes a dental video probe 22 which is supplied light from a source of illumination contained within the video processor via a fiber optic bundle cable 24. The dental video probe 22 also includes an electric line 26 which carries a CCD video signal from the probe 22 to the video processor 14. The video display system 10 is customarily used by a dentist to view the dental anatomy of a patient while the patient is in the dentist chair. The video probe 22 is inserted into the patient's mouth and directed or aimed to the location which is desired to be viewed on the video monitor 16. Proper use of the video probe for focusing of the tooth or gum area to be viewed on the monitor 16 includes placing the probe against the jaw or teeth of the patient to assist in steadying the probe. The image on the monitor 16 can then be fine tuned by making minor adjustments to the position of the probe 22 while viewing the image on the monitor screen. At any point during this examination procedure, the dentist is able to provide a permanent hard copy picture 20 of the image appearing on the video monitor 16.

Figure 4:
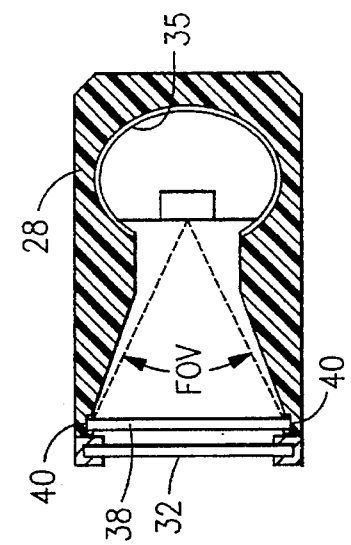
FIG. 4 is a cross sectional view of the top of the present film holder taken along section line 4—4 of FIG. 3.
Figure 3:
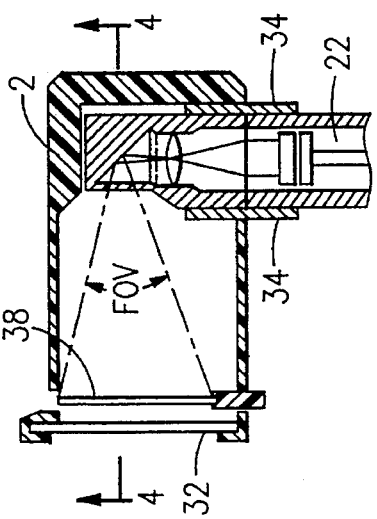
FIG. 3 is a cross sectional view of the present film holder and a portion of a video probe fully inserted therein.
Figure 2:
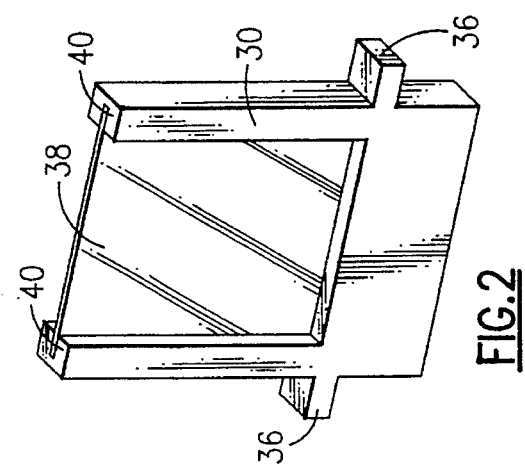
FIG. 2 is an isolated perspective view of the slidable frame utilized in accordance with the film holder of the present invention.

The x-ray film holder 12 includes a housing 28, a slidable frame 30, a diffuser 32, and a neck portion 34 with an aperture 35 formed therein. Use of the x-ray film holder 12 is commenced by inserting the dental vide probe 22 into the aperture 35 formed in the neck portion 34. In the preferred embodiment shown in the drawing, the aperture 35 is oval in shape and corresponds directly to the oval cross-sectional shape of the dental video probe 22. In this manner, the probe 22 is insertible into the housing with an orientation which places the head of the probe in proper alignment with the sliding frame 30. Referring now to FIG. 2, it is shown that the sliding frame 30 includes a pair of finger lugs 36-36. During use of the x-ray film holder 12, the dentist may easily slide the slidable frame 30 upward relative to the housing 28. In this condition, a standard piece of dental x-ray film 38 may be quickly and easily inserted or removed from the frame 30 while it is held in its extended raised position. The dental x-ray film 38 is secured within the frame 30 by quick release fasteners 40 as shown in FIG. 2. FIGS. 3 and 4 show that with the particular dimensions of the x-ray film holder 12, the field of view (FOV) of the video probe 22 is set to accurately and completely encompass the image of x-ray film 38 from top to bottom as well as from left to right. In this manner, a hard copy picture of the image of the x-ray film may readily be acquired from the printer 18.

The housing 28 and slidable frame 30 are each preferably formed from a durable and rigid plastic material such as ABS, polycarbonate, or a glass filled polycarbonate. The diffuser 32 is preferably formed from a translucent plastic material or clear sheet material with an applied frost coat. During the hard copy picture taking process described above, sufficient light is supplied by ambient room light or an auxiliary light source. The diffuser 32 is thus employed to spread ambient light evenly over the reverse side of the x-ray film 38 contained in the film holder 12. In this manner, the diffuser provides a suitable backdrop for the image on the film 38.

There has thus been described a simple yet novel device for accurately positioning x-ray film relative to the head of a dental video probe so that a clearly focused permanent image of the film may be produced by currently available video display systems.

While this invention has been described in detail with reference to a certain preferred embodiment, it should be appreciated that the present invention is not limited to that precise embodiment. Rather, in view of the present disclosure which describes the best mode for practicing the invention, many modifications and variations would present themselves to those of skill in the art without departing from the scope and spirit of this invention, as defined in the following claims.

What is claimed is:

1. A film holder for a video display system having a video probe with a head portion, a processor, a monitor, and a printer, said film holder comprising:

a housing for positioning a film relative to the video probe, said housing including;

receiving means for positioning and securing the head portion of the video probe within the housing;

diffuser means for diffusing light entering said housing; and frame means positioned between said diffuser means and said receiving means, said frame means for securing the film a predetermined distance from the head of the video probe.

2. The film holder according to claim 1 wherein said receiving means includes a neck portion with an aperture therein passing into a chamber contained within said housing.

3. The film holder according to claim 2 wherein the aperture in said neck portion has the same shape as a cross section of the probe head so that the probe head is snugly insertable into said neck portion by a close sliding fit.

4. The film holder according to claim 1 wherein said diffuser means includes a translucent plastic window in said housing being positioned opposite said neck portion.

5. The film holder according to claim 1 wherein said frame means is sized to hold a preselected piece of an exposed x-ray film.

6. The film holder according to claim 5 wherein said frame means is slidably retained within said housing and includes finger lugs so that part of said frame means is movable to a location exterior to said housing to allow the preselected piece of the exposed x-ray film to be inserted or removed from said frame means.

* * * * *